United States Patent [19]

Fujimori et al.

[11] Patent Number: 5,063,773
[45] Date of Patent: Nov. 12, 1991

[54] DYNAMOMETER

[75] Inventors: Sadao Fujimori; Akira Yamamoto; Satoru Taneda, all of Tokyo, Japan

[73] Assignee: Kabushiki Kaisha Meidensha, Tokyo, Japan

[21] Appl. No.: 575,235

[22] Filed: Aug. 30, 1990

[30] Foreign Application Priority Data

| Aug. 31, 1989 | [JP] | Japan | 1-102350[U] |
| Aug. 31, 1989 | [JP] | Japan | 1-225528 |
| Sep. 19, 1989 | [JP] | Japan | 1-242597 |
| Sep. 20, 1989 | [JP] | Japan | 1-243883 |
| Sep. 27, 1989 | [JP] | Japan | 1-113016[U] |
| Oct. 5, 1989 | [JP] | Japan | 1-261023 |
| Feb. 2, 1990 | [JP] | Japan | 2-16513[U] |

[51] Int. Cl.$^5$ .............................................. G01L 3/02
[52] U.S. Cl. ..................................................... 73/117
[58] Field of Search ......................... 73/117, 123, 126

[56] References Cited

U.S. PATENT DOCUMENTS 4,077,255  3/1978  Murakami ............................ 73/117

Primary Examiner—Jerry W. Myracle
Attorney, Agent, or Firm—Bachman & LaPointe

[57] ABSTRACT

A chassis dynamometer designed for effectively performing bench testing performance of an automotive vehicle, comprises a first roller supported on a swingable shaft and housing therein stator and rotor forming a dynamometer, a second roller coupled with said first roller for synchronous rotation therewith; a flywheel detachably and coaxially disposed within the interior space of the second roller for rotation therewith; and a retainer associated with said flywheel, for detachably retaining said flywheel within the interior space of the second roller, the retainer restricting axial displacement of the flywheel relative to the second roller.

25 Claims, 11 Drawing Sheets

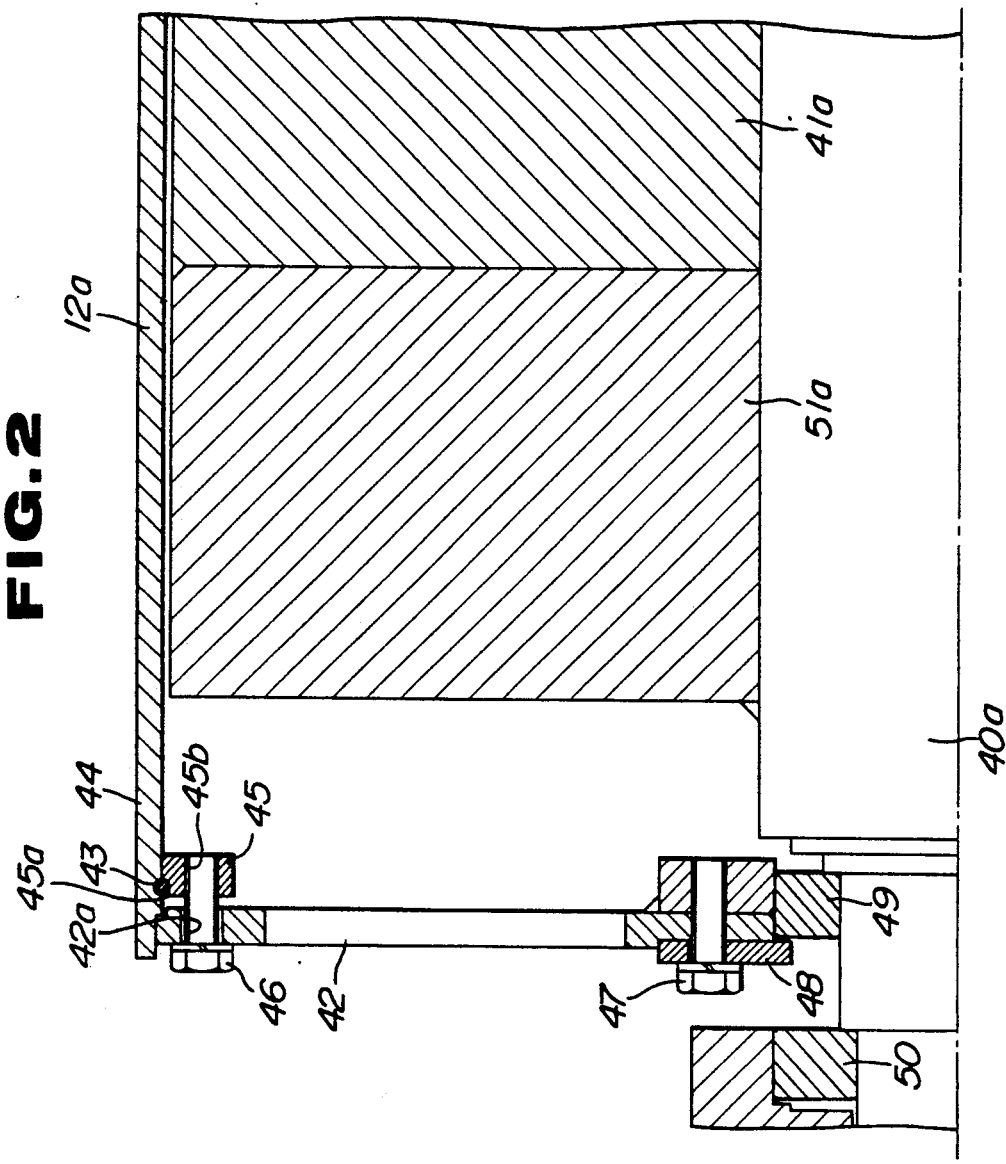

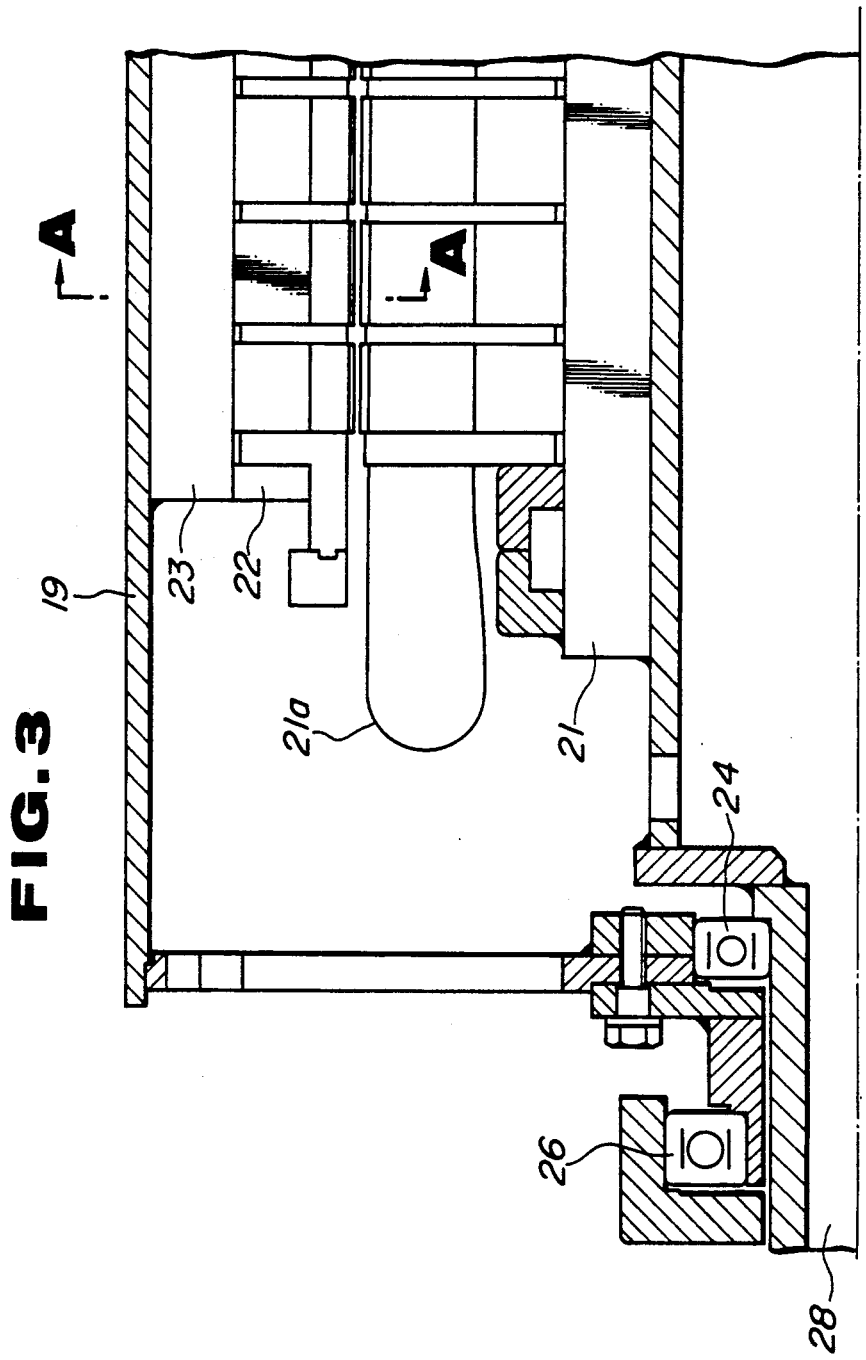

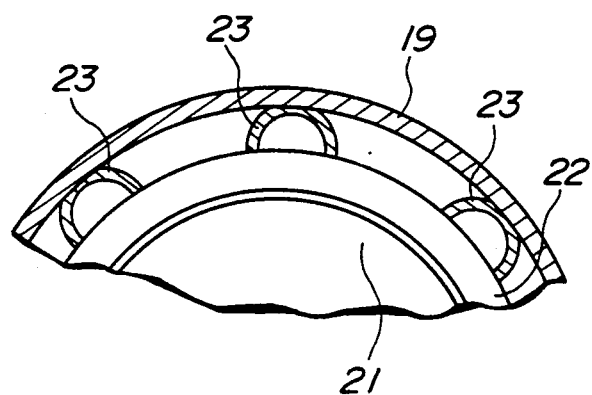
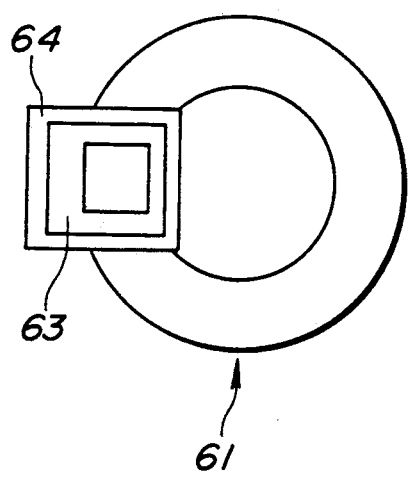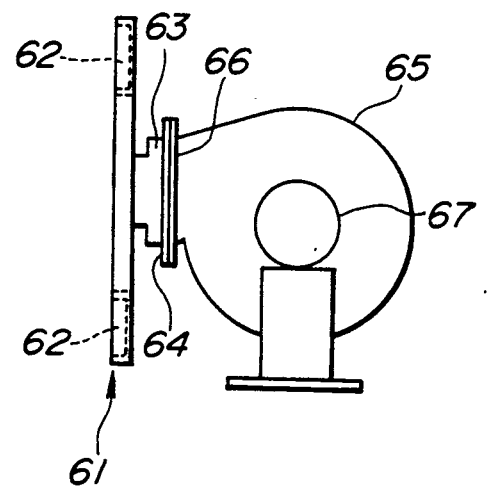

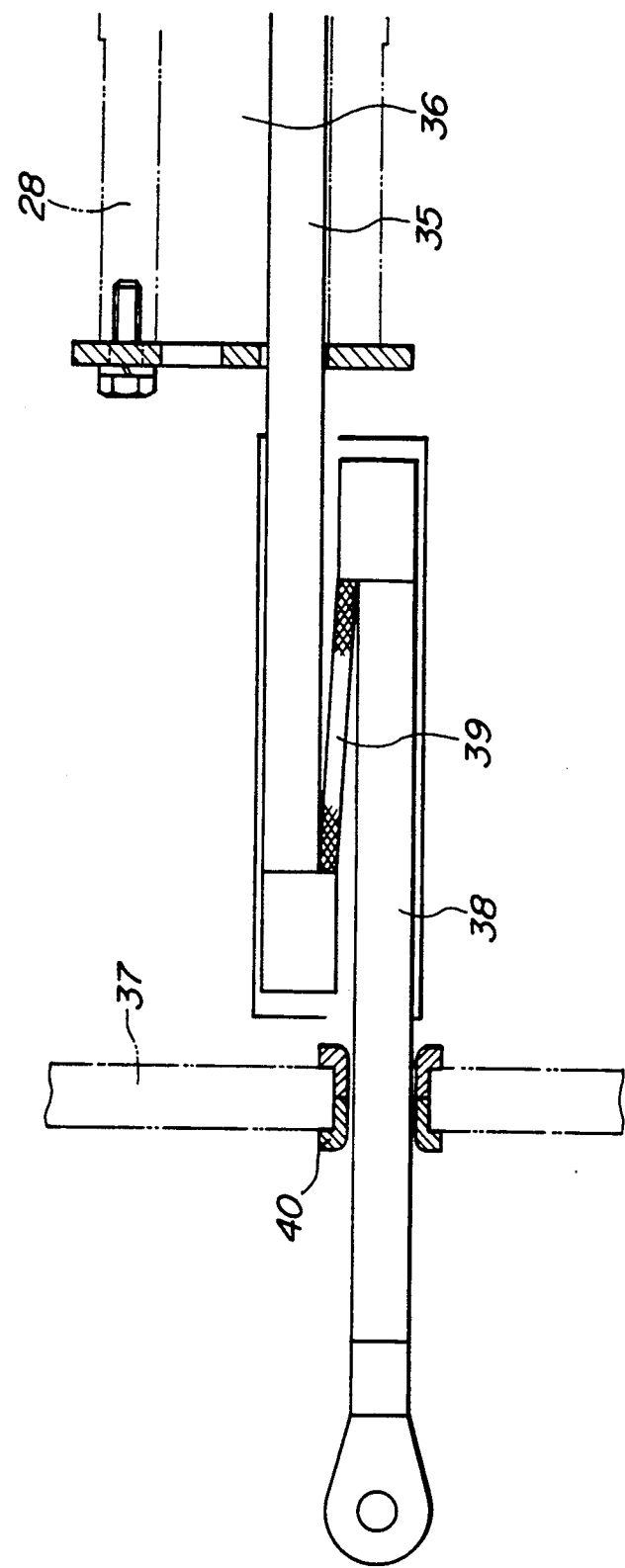

DYNAMOMETER

BACKGROUND OF THE INVENTION

1. Field of the Invention

The present invention relates generally to a dynamometer for testing performance of a vehicle, such as an automotive vehicle.

2. Description of the Background Art

In automotive industries, chassis dynamometers have been used for testing performance of automotive vehicles by simulating running resistance, up- and down-hill road, vehicular load and so forth. Such chassis dynamometers are conveniently used for a simulated road test in order to measure performance of the vehicle and/or to measure fuel consumption. For such chassis dynamometers, appropriately setting conditions of testing is a most important feature for determining accuracy level of the results.

For example, it is important for simulating inertia moment which is variable depending upon overall weight of the vehicle. For simulating inertia moment to be exerted on the vehicle during actual driving, a flywheel has been utilized. A typical construction of the chassis dynamometer has been disclosed in Japanese Patent First (unexamined) Publication (Tokkai) Showa 60-149944, published on Aug. 7, 1985. In the publication, there is disclosed a chassis dynamometer for which the flywheel is externally connected for simulating vehicular inertia weight.

In the recent years, there has been proposed a twin roller type chassis dynamometer which has provided two rollers. One of the rollers is designed to be placed at the vehicular tread to be rotatingly driven by the vehicular wheel, which roller is practically called a "free roller". The other wheel is coupled with the flywheel. In the further advanced technology, there has been developed and proposed the free roller, in which the flywheel is built in. As can be appreciated, for accurately simulating the vehicular inertia, it is essential to accurately adjust the inertia moment of the flywheel. The adjustment of the inertia moment on the flywheel can be done by adjusting the diameter of the flywheel since the inertia moment is proportional to the flywheel diameter. To this, difficulty is encountered in adjustment of the flywheel diameter due to limited space for building in the flywheel. Because of limited space to install the flywheel, it becomes necessary to use a heavier flywheel. In addition, since a relatively heavy flywheel is housed within the free roller, reinforcement for the free roller becomes essential to avoid the possibility of distortion, vibration and creation of noise.

SUMMARY OF THE INVENTION

Therefore, it is an object of the present invention to provide a dynamometer which can solve drawbacks in the prior art.

In order to accomplish aforementioned and other objects, a chassis dynamometer, according to the present invention, is designed for effectively performing bench testing performance of an automotive vehicle, which comprises a first roller supported on a swingable shaft and housing therein stator and rotor forming a dynamometer, a second roller coupled with the first roller for synchronous rotation therewith; a flywheel detachably and coaxially disposed within the interior space of the second roller for rotation therewith; and means, associated with the flywheel, for detachably retaining the flywheel within the interior space of the second roller, the retaining means restricting axial displacement of the flywheel relative to the second roller.

According to one aspect of the invention, a chassis dynamometer for testing performance of an automotive vehicle, comprises:

a first roller supported on a swingable shaft and housing therein stator and rotor forming a dynamometer;

a second roller coupled with the first roller for synchronous rotation therewith;

a flywheel detachably and coaxially disposed within the interior space of the second roller for rotation therewith; and means, associated with the flywheel, for detachably retaining the flywheel within the interior space of the second roller, the retaining means restricting axial displacement of the flywheel relative to the second roller.

According to another aspect of the invention, a chassis dynamometer for testing performance of an automotive vehicle, comprises:

a first roller unit oriented at a position transversely offset from the longitudinal axis in one direction of the automotive vehicle to be tested;

a second roller unit oriented at a position transversely offset from the longitudinal axis in the other direction of the automotive vehicle to be tested;

each of the first and second roller units comprising, a first roller supported on a swingable shaft and housing therein stator and rotor forming a dynamometer;

a second roller coupled with the first roller for synchronous rotation therewith;

a flywheel detachably and coaxially disposed within the interior space of the second roller for rotation therewith; and means, associated with the flywheel, for detachably retaining the flywheel within the interior space of the second roller, the retaining means restricting axial displacement of the flywheel relative to the second roller.

The stator may have a stator core wound therearound first, second and third coils forming three phase stator coils, respective of the first, second and third coils of the second roller unit are connected in series with corresponding phase of first, second and third coils in the first roller unit. In such case, respective of series circuit of the first, second and third coils are connected by way of delta connection relative to an inverter circuit. Alternatively, respective of series circuit of the first, second and third coils may be connected by way of star connection relative to an inverter circuit. The stator core may be mounted on the inner periphery of the first roller in a spaced apart relationship to the latter for defining therethrough an cooling air passage permitting axial flow of the cooling air. On the other hand, the stator core may be mounted on the inner periphery of the first roller by means of a plurality of spacer brackets circumferentially arranged with a given internal for defining the cooling air passage between adjacent one of the spacer bracket.

The chassis dynamometer may further comprise a blower unit for generating cooling air flow in the axial direction of the first roller through the cooling air passage. The blower unit may comprise a blower for generating axial air flow and an air flow guide guiding the cooling air discharged from the blower in circumferential direction for establishing axial cooling air flow through a plurality of cooling air passages defined between the stator core and the first roller and arranged in circumferential distribution. In such case, the air flow guide may comprise an essentially annular groove opening toward one axial end of the first roller, the annular groove extending at radial orientation corresponding to radial position of the cooling air passages. Preferably, the groove of the air flow guide is oriented in the vicinity of the one axial end of the first roller in such an extent that the rotation of the first roller may cause deflection of air flow in circumferential direction for establishing axial air flow in axial direction at overall open end of the groove.

Each of the mounting bracket may comprise an arc-shaped member defining auxiliary cooling air passage extending in axial direction. Furthermore, the stator core defines a plurality of axially extending holes for defining auxiliary cooling air passage therethrough.

The retaining means may comprise a stopper member which is per se detachable relative to the first roller. In the alternative, the retaining means may comprise a stopper member carried with the flywheel and movable between a first position, in which the stopper member is projected from the outer periphery of the flywheel and engages with a stopper opening defined through the first roller, and a second position, in which the retaining means of retracted radial inside of the flywheel for permitting axial displacement of the flywheel in axial direction.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and understanding only.

In the drawings:

FIG. 2 is an enlarged section of mounting structure for rollers employed in the first embodiment of the chassis dynamometer of FIG. 1;

FIG. 3 is an enlarged section of major part a dynamometer employed in the first embodiment of the chassis dynamometer of FIG. 1;

FIG. 4 is a cross section taken along line A—A in FIG. 3;

FIG. 5 is an enlarged section showing wiring structure employed in the first embodiment of the chassis dynamometer of FIG. 1;

FIG. 6 is a front elevation of cooling system employed in the first embodiment of the chassis dynamometer of FIG. 1;

FIG. 7 is a side elevation of the cooling system of FIG. 6;

DESCRIPTION OF THE PREFERRED EMBODIMENT

Figure 1:
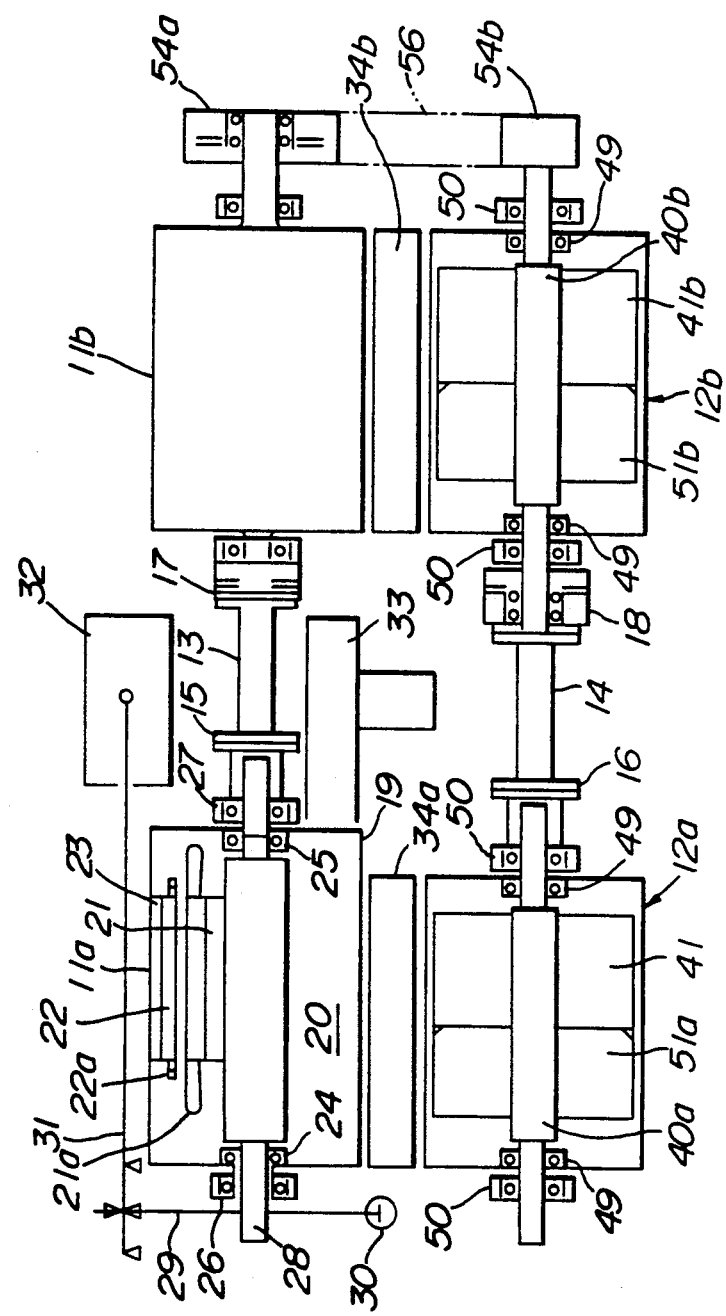
FIG. 1 is a schematic and diagrammatic illustration of the first embodiment of a twin roller chassis dynamometer according to the present invention.

Referring now to the drawings, particularly to FIG. 1, the first embodiment of a chassis dynamometer, according to the present invention, has a pair of rollers 11a and 11b arranged in spaced apart relationship with each other in such a manner that both of the rollers are placed at transverse orientation corresponding to a tread of an automotive vehicle to be tested. These rollers 11a and 11b will be hereafter referred to as "load rollers". As can be seen from FIG. 1, the load rollers 11a and 11b are connected to each other via a rotary shaft 13 which extends essentially in parallel to the drive shaft of the vehicle. A coupling 15 and a brake 17 are provided on the rotary shaft 13 in a per se known manner. A pair of free rollers 12a and 12b are provided at corresponding orientations to associated load rollers 11a and 11b and in parallel relationship thereto. Similarly to the load rollers 11a and 11b, the free rollers 12a and 12b are connected to each other via a rotary shaft 14. Respective of driving wheels, i.e. left and right driving wheels, of the vehicle are placed between respective pairs of the load roller and the free rollers 11a, 12a and 11b, 12b. The rotary shaft 14 is provided with a coupling 16 and a brake 17.

A roller dynamometer which is generally identified by the reference numeral "20", is housed within the load roller 11a. The roller dynamometer 20 includes a metallic stator core 21. Surrounding the stator core 21, a rotor core 22 is provided. A rotor coil 22a is wound around the rotor core 22. The rotor core 22 is mounted on the inner periphery of the roller body 19 of the load roller 11a by means of one or more mounting brackets 23. On the other hand, the stator core 22 is rotatably supported by means of swingable bearings 24 and 25 which are disposed within the roller body 19. Rotary bearings 26 and 27 are provided outside of the roller body 19. These rotary bearings 26 and 27 rotatingly support the roller body 19. A swingable shaft 28 is extended from the roller body 19 and coupled with a swing arm 29. The swing arm 29 is connected to a load cell 30 at one end thereof. The other end of the swing arm 29 is coupled with a weight mass 32 via a lever mechanism 29.

An intermediate lifts 34a and 34b are provided in spaces respectively defined between the load rollers and the free rollers 11a, 12a and 11b, 12b. The intermediate lifts 34a and 34b are designed to be operated between an extended position protruding into the clearance between the load wheel and the free wheel for enabling the vehicular driving wheel to move away from the clearance, and a retracted position shifted down from the clearance so as not to contact with the vehicular wheel. A cooling unit 33 including a cooling fan is provided for generating cooling air flow. The load wheels 11a and 11b and the free wheels 12a and 12b respectively connected by rotary shafts 13 and 14, cooperate with a pair of timing pulleys 54a and 54b and a timing belt 56 extending thereover.

As shown in FIG. 2, flywheels 41a and 41c are mounted on roller shafts 40a and 40b of respective free rollers 12a and 12b. For preventing the flywheels 41a and 41b from loosing away from the roller shafts 40a and 40b, brackets 42 are provided, which bracket is detachably mounted on the axial ends of the free rollers 12a and 12b. In order to detachably mount the bracket 42, a circumferentially extending cross-sectionally semi-circular groove 43 is formed on the inner periphery of each of the free rollers 12a and 12b. A cross-sectionally circular stopper member 44 is detachably mounted in the groove 43 in a form approximately half of the stopper member 44 is projected from the inner periphery of each of the free roller 12a and 12b. An annular stopper flange 45 is provided axially inside of the stopper member 44. The stopper flange 45 is formed with a cut-out 45a extending along the outer circumferential edge thereof so that the stopper flange 45 may engage with the stopper member 44 at the cut-out 45. The stopper flange 45 defines one or more threaded bores 45b to engage with fastening bolts 46 which extend through openings 42a formed through the bracket 42. On the other hand, the radially central portion of the bracket 42 is also secured on a bearing 49 mounted on the rotor shaft 40a or 40b with another bearing 50, by means of a flange 48 and fastening bolts 48.

With the shown construction, each of the flywheels 41a and 41b is installed within the interior space of associated one of the free rollers 12a and 12b through the following process. At first, the stopper member 44 is removed from the groove 42 for enabling insertion of the flywheel 42a or 42b and the stopper flange 45. Thereafter, the bracket 42 is fixed by tightening the fastening bolts 46 to threaded bores 45b and by tightening the fastening bolts 57. By this, the bracket 42 can be firmly secured in the interior space of the free roller 12a and 12b. On the other hand, when additional inertial moment is required, additional flywheels 51a and 51b are installed. In such case, the fastening bolts 46 and 47 are disengaged for removing the bracket 42. Thereafter, the stopper member 44 is removed from the groove 43 so that the flange 45 can be removed away from the interior space of the free roller 12a or 12b. Thus, the path for inserting the additional flywheel 51a or 51b can be provided. Then, the bracket 42 is reinstalled in the same manner as set forth above.

It should be appreciated that the groove 43, the stopper member 44 and the cut-out 45 are not necessary to be extended over the entire circumference. Also, it may be possible to provide a plurality of sets of the groove and stopper member and the cut-out can be provided.

As can be appreciated, with the shown construction, the diameter of the flywheel can be maximized for no radial clearance is required for installation within the interior space of the free roller. Furthermore, the shown construction makes it easy to install any number of flywheels for adjusting inertia moment to be exerted on the vehicular wheel. This make it possible to precisely adjust the inertia moment to be generated by the flywheel and thus to accurately simulate the actual driving resistance.

FIGS. 3 and 4 show detailed construction of the roller dynamometer 20 employed in the shown embodiment of the chassis dynamometer according to the invention. As can be seen from FIGS. 3 and 4, the roller dynamometer 20 is housed within the roller body 19 of the load roller 11a. The rotor core 22 is mounted by means of a plurality of mounting brackets 23 arranged with given circumferential intervals. In the preferred construction, each of the mounting brackets 23 is formed into cross sectionally C-shaped or semi-circular shaped configuration, as clearly shown in FIG. 4. Each mounting bracket 23 is rigidly secured onto the inner periphery of the roller body 19 at the round top thereof. In the shown construction, eight mounting brackets 23 are provided at regular intervals. With the shown construction, the mounting brackets 23 may serve as a spacer for providing clearance between the inner periphery of the roller body 19 and the outer periphery of the rotor core 22. With the clearance, cooling air may flow therethrough so that the heat radiated from the rotor core 22 will not be transmitted to the roller body 19. As a result, the roller body 19 can be maintained at a temperature low enough so as not to influence the tires of the vehicle.

As shown in FIG. 5, the swingable shaft 28 defines therethrough a lead wire receptacle space 36, through which a lead wire 35 is extended. The lead wire 35 is connected to the stator coil of the roller dynamometer 20 at one end. The other end of the lead wire 35 extends from the swingable shaft 28. The lead wire 35 is connected to an extension wire 38 extending through a base 37 via a flexible conductor 39. A grommet 40 is provided in the opening of the base 37. While the roller dynamometer 20 is driven torsional torque is exerted on the lead wire 35. The torsional torque on the lead wire 35 can be absorbed by the flexible conductor so as not to be transferred to the extension wire 38.

Figure 8:
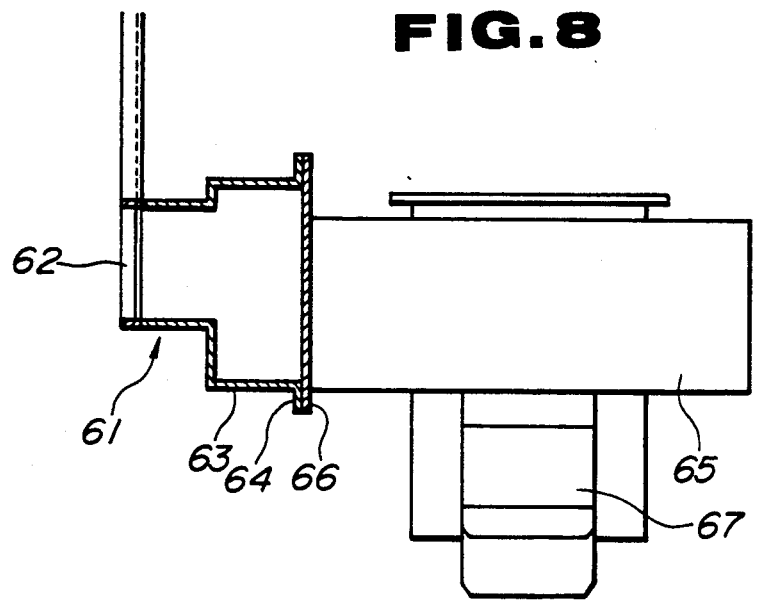
FIG. 8 is a plan view of the cooling system of FIG. 6.

FIGS. 6 to 8 show the preferred construction of the cooling unit 33 employed in the first embodiment of the chassis dynamometer according to the invention. As can be seen, the cooling unit 33 includes an air guide 61 of generally annular ring shaped configuration in front elevation. The air guide 61 is formed with a circumferentially extending air guide groove 62. The air guide groove 62 opens at one side face which is oriented in the vicinity of one axial end of the load roller 11a. A blower fan unit or cooling fan unit 65, which is driven by a motor 67 has a discharge outlet communicated with the air guide groove 62 via a communication duct 63 which is connected to the unit 65 via the flanges 64 and 66.

With the shown construction, the cooling air discharged from the blower or cooling fan unit 65 is introduced into the air guide groove 62. While the load roller 11a is driven to rotate, the cooling air introduced into the air guide groove 62 is deflected to generate partial flow in a circumferential direction along the guide. As a result, certain level cooling air distribution through the air guide groove 62 is achieved. On the other hand, the air in the air guide groove 62 flows in an axial direction through the interior space of the load roller 11a. With the mounting structure of the rotor core as set forth above, satisfactory cooling efficiency for the roller body can be obtained.

The shown construction of the cooling system introduced in the shown embodiment is advantageous in comparison with conventional cooling systems, in which the cooling air is blown toward the outer periphery of the load roller. Namely, since the air flow directed toward the outer periphery in a circumferential direction is not in the shown embodiment, a reacting force which may influence for measuring driving torque and so forth, cannot be induced. Furthermore, since the cooling unit can be installed in an axially offset orientation with respect to the load roller, substantial space for installation of the cooling unit becomes unnecessary.

Figure 10:
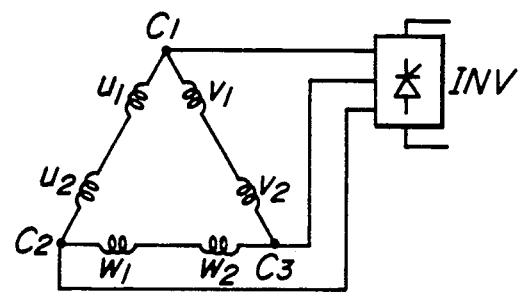
FIG. 10 is a circuit diagram of a stator coil formed by delta connection and formed in the dynamometer employed in the second embodiment of the chassis dynamometer of FIG. 9.
Figure 11:
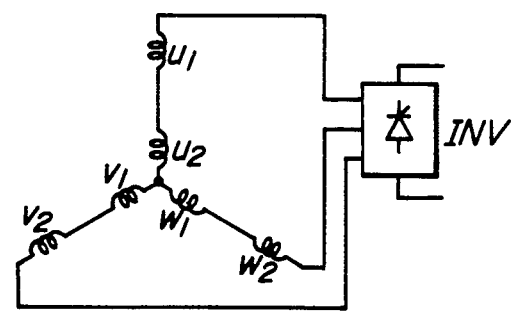
FIG. 11 is a circuit diagram of a stator coil formed by star connection, which is also applicable for the second embodiment of the dynamometer of FIG. 9.
Figure 9:
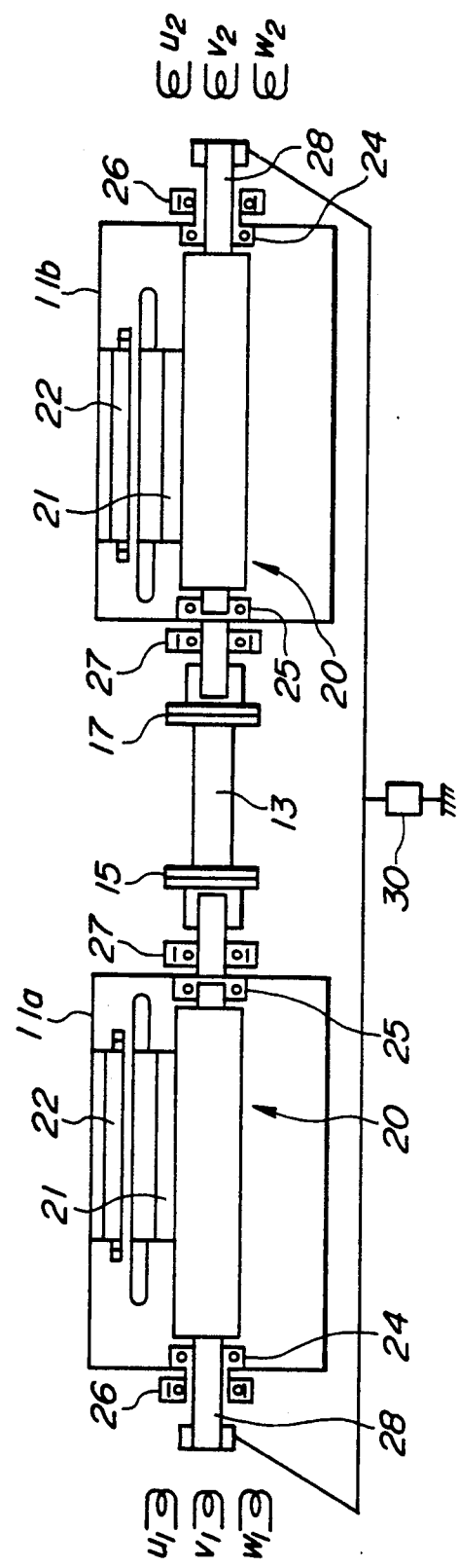
FIG. 9 is a schematic and a diagrammatic illustration of the second embodiment of the chassis dynamometer according to the invention.

On the other hand, the stator coil wound around the stator cores 21 in the roller dynamometers 20 in the load rollers 11a and 11b are respective of three phase coils. As explanatorily shown in FIG. 9, the three phase coils of the roller dynamometer associated with the load roller 11a are respectively represented by $U_1$, $V_1$ and $W_1$. Similarly, the three phase coils of the roller dynamometer associated with the load roller 11b are respectively represented by $U_2$, $V_2$ and $W_2$. In the shown embodiment, respective phase of coils $U_1$, $U_2$; $V_1$, $V_2$; and $W_1$, $W_2$ are respectively connected in series with respect to an inverter INV. The series circuit of the corresponding coils $U_1$, $U_2$; $V_1$, $V_2$; and $W_1$, $W_2$ can be connected in delta connection at the junctions $C_1$, $C_2$ and $C_3$ relative to the inverter INV, as shown in FIG. 10. In the alternative, the series circuits may connected in start connection as shown in FIG. 11.

In either case, since the corresponding coils of the both roller dynamometers 20 are connected in series, influence of difference or fluctuation of impedance can be successfully avoided.

Figure 12:
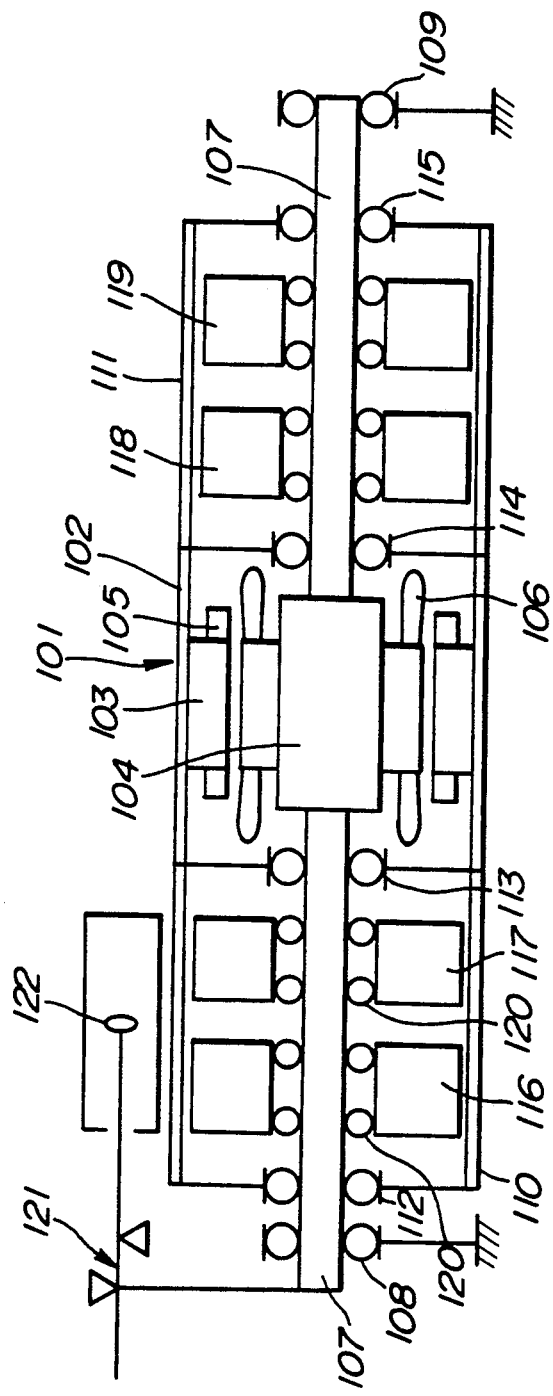
FIG. 12 is a schematic and diagrammatic illustration of the third embodiment of the chassis dynamometer according to the invention.
Figure 13:
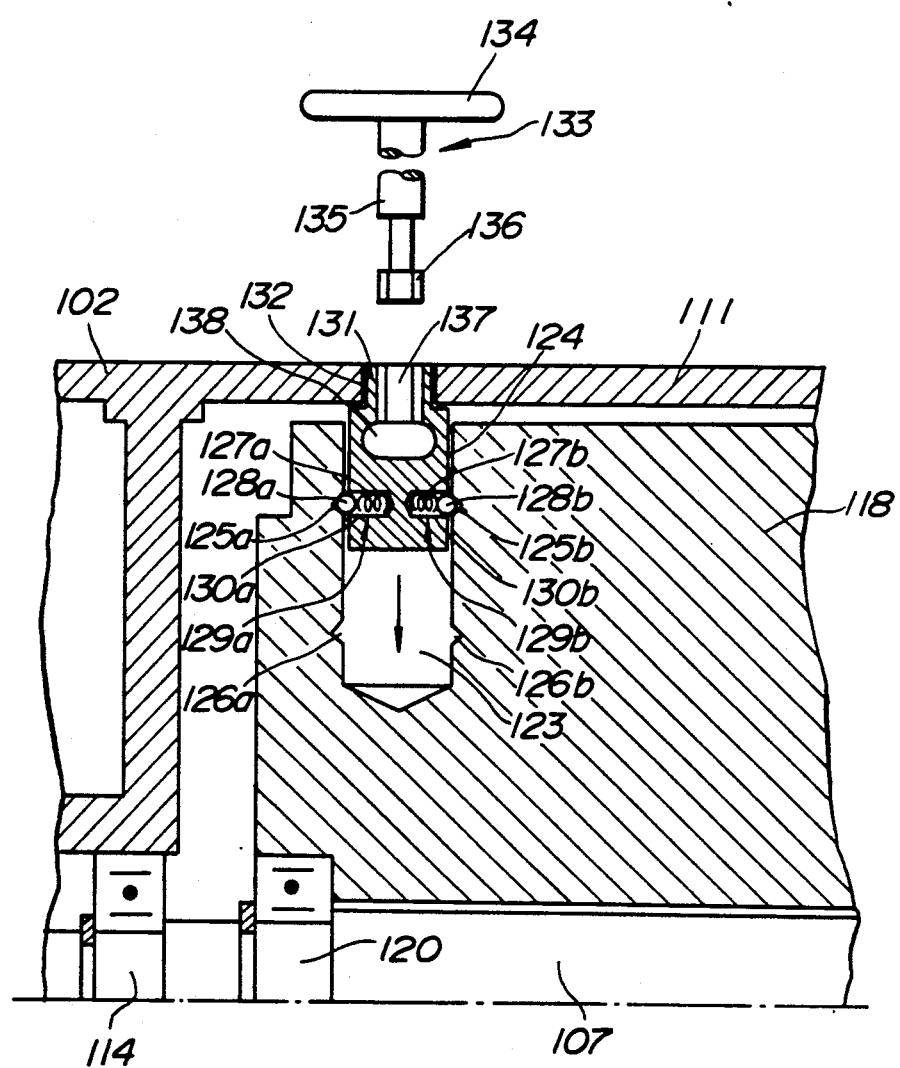
FIG. 13 is an enlarged section showing a structure for mounting a flywheel onto a roller employed in the third embodiment of the chassis dynamometer.
Figure 14:
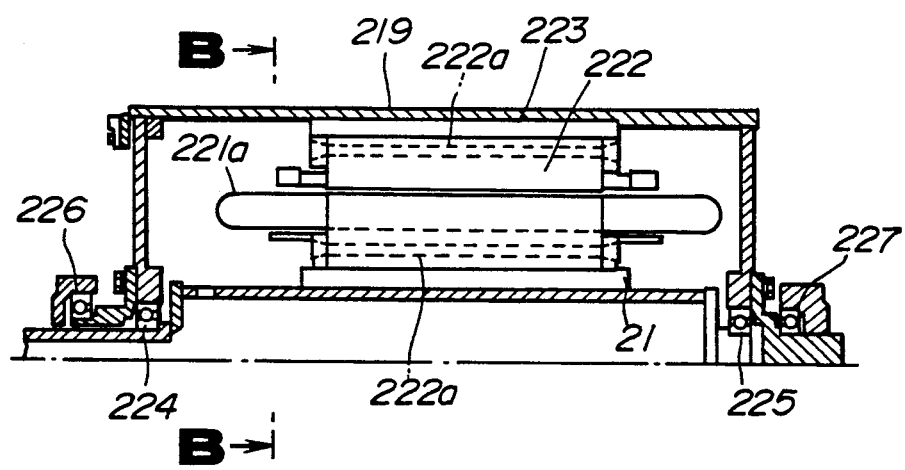
FIG. 14 is a section of the fourth embodiment of the chassis dynamometer according to the invention.
Figure 15:
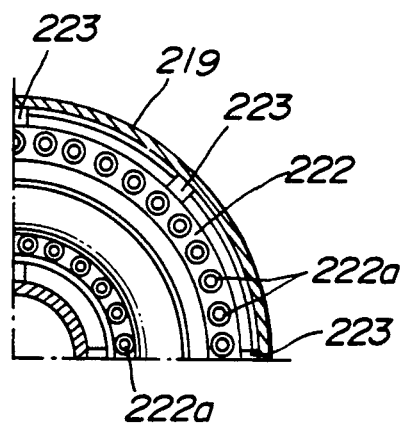
FIG. 15 is an enlarged section taken along line B—B of FIG. 14.
Figure 16:
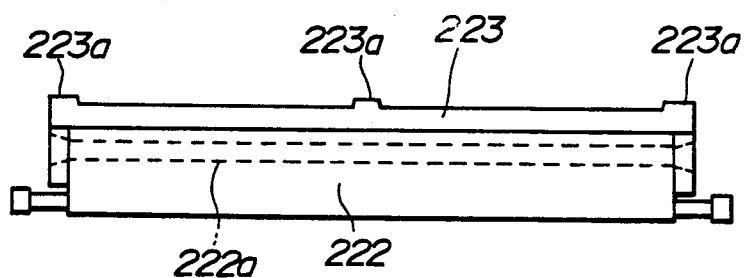
FIGS. 16 and 17 show a further embodiment and modification of the roller dynamometer of the invention.
Figure 17:
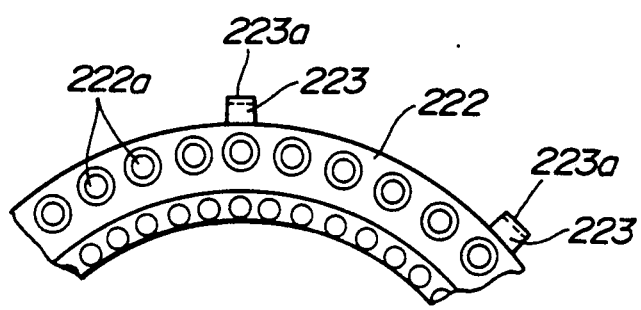

FIGS. 12 and 13 show the second embodiment of the chassis dynamometer according to the present invention, In this embodiment, the load roller 102 with the roller dynamometer 101 and the free wheels 110 and 111 with the flywheels 116, 117, 118 and 119 are arranged in axial alingment with each other. In such case, all of the load roller 102 and the free wheels 110 and 111 are supported on a common swingable shaft 107. The swingable shaft 107 is supported by means of swingable bearings 112, 113, 114 and 115. The swingable shaft 107 is also supported rotatably with bearings 108 and 109. Similarly to the foregoing embodiment, the swingable shaft 107 is connected to a swing arm associated with a lever mechanism 121 with a mass weight 122.

As shown in FIG. 13, the flywheel 18 is formed with a radially extending bore. The radially extending bore 123 receives therein a key member 124. On the inner periphery of the bore, pairs of essentially V-shaped recesses 125a, 125b and 126a, 126b are formed in axially offset position to each other. A pair of clutches 129a and 129b comprising springs 127a and 127b and balls 128a and 128b and housed within a receptacle bores 130a and 130b defined in the key member 124, engage with one of the pair of recesses 125a, 125b and 126a, 126b. The radially outer cylindrical end 131. The cylindrical end 131 is designed to be engaged with a radial opening 132 when the flywheel 118 is installed in the free wheel 111. A hexagonal bore 137 is formed through the cylindrical end 131.

For releasing the flywheel 118, a tool 133 which has a hexagonal head conforming the hexagonal bore 137 and a handle 134 is used. The hexagonal head 136 is inserted into the hexagonal bore 137. At this position, the tool 133 is further depressed to depress the key 124 inwardly so as to engage the clutches 129a and 129b are engaged with the radially inner pair of recesses 126a and 126b. At this position, the outer end of the key 124 stays inside of the bore 123 to permitting removable of the flywheel 118. Therefore, the flywheel can be easily removed and replaced for allowing fine adjustment of inertia.

Similar construction for installation can be applied for the flywheels 116, 117 and 119.

While the preferred embodiment has been discussed in terms of the preferred embodiment of the invention, the invention will be embodied in various fashion. Therefore, the invention should be appreciated to include all possible embodiments and modifications which can be implemented without departing from the principle of the invention set out in the appended claims.

For example, the construction of the roller dynamometer in the foregoing embodiments can be modified as illustrated in FIGS. 14 to 17. In the shown embodiment, the rotor core 222 is formed with a plurality of axially extending through openings 222a. Also the mounting brackets 223 are modified from that of the first embodiment. Namely, in this embodiment, the mounting brackets 223 with a plurality of projecting portion 223a are mounted with the rotor core 222 at given intervals. As can be clear seen from FIGS. 16 and 17, the mounting brackets 223 are radially protruded from the outer periphery of the rotor core 222. Other construction of the roller dynamometer can be the same as that illustrated above. Respective of corresponding components to the foregoing embodiments will be represented by the reference numerals two hundreds greater than that of the first embodiment.

What is claimed is:

1. A chassis dynamometer for testing performance of an automotive vehicle, comprising:
    a first roller supported on a swingable shaft and housing therein stator and rotor forming a dynamometer;
    a second roller coupled with said first roller for synchronous rotation therewith;
    a flywheel detachably and coaxially disposed within the interior space of said second roller for rotation therewith; and
    means, associated with said flywheel, for detachably retaining said flywheel within said interior space of said second roller, said retaining means restricting axial displacement of said flywheel relative to said second roller.

2. A chassis dynamometer as set forth in claim 1, wherein said stator has a stator core firmly mounted on said the inner periphery of said first roller in a spaced apart relationship to the latter for defining therethrough an cooling air passage permitting axial flow of the cooling air.

3. A chassis dynamometer as set forth in claim 2, wherein said stator core is mounted on the inner periphery of said first roller by means of a plurality of spacer brackets circumferentially arranged with a given internal for defining said cooling air passage between adjacent one of the spacer bracket.

4. A chassis dynamometer as set forth in claim 3, which further comprises a blower unit for generating cooling air flow in the axial direction of said first roller through said cooling air passage.

5. A chassis dynamometer as set forth in claim 4, wherein said blower unit comprises a blower for generating axial air flow and an air flow guide guiding the cooling air discharged from said blower in circumferential direction for establishing axial cooling air flow through a plurality of cooling air passages defined between said stator core and said first roller and arranged in circumferential distribution.

6. A chassis dynamometer as set forth in claim 5, wherein said air flow guide comprises an essentially annular groove opening toward one axial end of said first roller, said annular groove extending at radial orientation corresponding to radial position of said cooling air passages.

7. A chassis dynamometer as set forth in claim 6, wherein said groove of said air flow guide is oriented in the vicinity of said one axial end of said first roller in such an extent that the rotation of said first roller may cause deflection of air flow in circumferential direction for establishing axial air flow in axial direction at overall open end of said groove.

8. A chassis dynamometer as set forth in claim 4, wherein each of said mounting bracket comprises an arc-shaped member defining auxiliary cooling air passage extending in axial direction.

9. A chassis dynamometer as set forth in claim 4, wherein said stator core defines a plurality of axially extending holes for defining auxiliary cooling air passage therethrough.

10. A chassis dynamometer as set forth in claim 1, wherein said retaining means comprises a stopper member which is per se detachable relative to said first roller.

11. A chassis dynamometer as set forth in claim 1, wherein said retaining means comprises a stopper member carried with said flywheel and movable between a first position, in which said stopper member is projected from the outer periphery of said flywheel and engages with a stopper opening defined through said first roller, and a second position, in which said retaining means of retracted radial inside of said flywheel for permitting axial displacement of said flywheel in axial direction.

12. A chassis dynamometer for testing performance of an automotive vehicle, comprising:
a first roller unit oriented at a position transversely offset from the longitudinal axis in one direction of the automotive vehicle to be tested;
a second roller unit oriented at a position transversely offset from the longitudinal axis in the other direction of the automotive vehicle to be tested;
each of said first and second roller units comprising,
a first roller supported on a swingable shaft and housing therein stator and rotor forming a dynamometer;
a second roller coupled with said first roller for synchronous rotation therewith;
a flywheel detachably and coaxially disposed within the interior space of said second roller for rotation therewith; and
means, associated with said flywheel, for detachably retaining said flywheel within said interior space of said second roller, said retaining means restricting axial displacement of said flywheel relative to said second roller.

13. A chassis dynamometer as set forth in claim 12, wherein said stator has a stator core wound therearound first, second and third coils forming three phase stator coils, respective of said first, second and third coils of said second roller unit are connected in series with corresponding phase of first, second and third coils in said first roller unit.

14. A chassis dynamometer as set forth in claim 13, wherein respective of series circuit of said first, second and third coils are connected by way of delta connection relative to an inverter circuit.

15. A chassis dynamometer as set forth in claim 13, wherein respective of series circuit of said first, second and third coils are connected by way of star connection relative to an inverter circuit.

16. A chassis dynamometer as set forth in claim 15, wherein said stator core is mounted on said the inner periphery of said first roller in a spaced apart relationship to the latter for defining therethrough an cooling air passage permitting axial flow of the cooling air.

17. A chassis dynamometer as set forth in claim 16, wherein said stator core is mounted on the inner periphery of said first roller by means of a plurality of spacer brackets circumferentially arranged with a given internal for defining said cooling air passage between adjacent one of the spacer bracket.

18. A chassis dynamometer as set forth in claim 17, which further comprises a blower unit for generating cooling air flow in the axial direction of said first roller through said cooling air passage.

19. A chassis dynamometer as set forth in claim 18, wherein said blower unit comprises a blower for generating axial air flow and an air flow guide guiding the cooling air discharged from said blower in circumferential direction for establishing axial cooling air flow through a plurality of cooling air passages defined between said stator core and said first roller and arranged in circumferential distribution.

20. A chassis dynamometer as set forth in claim 19, wherein said air flow guide comprises an essentially annular groove opening toward one axial end of said first roller, said annular groove extending at radial orientation corresponding to radial position of said cooling air passages.

21. A chassis dynamometer as set forth in claim 20, wherein said groove of said air flow guide is oriented in the vicinity of said one axial end of said first roller in such an extent that the rotation of said first roller may cause deflection of air flow in circumferential direction for establishing axial air flow in axial direction at overall open end of said groove.

22. A chassis dynamometer as set forth in claim 18, wherein each of said mounting bracket comprises an arc-shaped member defining auxiliary cooling air passage extending in axial direction.

23. A chassis dynamometer as set forth in claim 18, wherein said stator core defines a plurality of axially extending holes for defining auxiliary cooling air passage therethrough.

24. A chassis dynamometer as set forth in claim 12, wherein said retaining means comprises a stopper member which is per se detachable relative to said first roller.

25. A chassis dynamometer as set forth in claim 12, wherein said retaining means comprises a stopper member carried with said flywheel and movable between a first position, in which said stopper member is projected from the outer periphery of said flywheel and engages with a stopper opening defined through said first roller, and a second position, in which said retaining means of retracted radial inside of said flywheel for permitting axial displacement of said flywheel in axial direction.

* * * * *